United States Patent [19]

Reese

[11] Patent Number: 5,074,571
[45] Date of Patent: Dec. 24, 1991

[54] SPARE BOWLING BALL CARRIER

[76] Inventor: Charles F. Reese, 23350 Schoolcraft, West Hills, Calif. 91307

[21] Appl. No.: 622,840

[22] Filed: Dec. 5, 1990

[51] Int. Cl.⁵ .......................... B62B 1/12; B62B 1/14
[52] U.S. Cl. .................... 280/47.19; 280/47.26.47.33; 280/79.2; 190/18 A; 206/315.91; 211/14; 220/524; D3/36; D34/24; D34/26
[58] Field of Search ............... 280/47.19, 47.26, 47.27, 280/47.33, 47.35, 79.2, 33.998; 220/524; 190/18 A; 206/315.9, 315.91; 211/14, 15; D3/36; D34/24, 26

[56] References Cited

U.S. PATENT DOCUMENTS

| | | | |
|---|---|---|---|
| 2,905,480 | 9/1959 | Giovannelli | 280/47.19 X |
| 3,308,911 | 3/1967 | Stevens et al. | 206/315.9 |
| 4,066,156 | 1/1978 | Basile | 280/47.26 X |
| 4,118,048 | 10/1978 | Spranger et al. | 280/47.35 |
| 4,166,530 | 9/1979 | Robinson | 206/315.9 |
| 4,188,990 | 2/1980 | Ross | 206/315.91 |
| 4,220,343 | 9/1980 | Robinson | 280/79.2 X |
| 4,281,843 | 8/1981 | Johnson et al. | 280/47.19 X |
| 4,632,412 | 12/1986 | Nasgowitz | 280/47.26 |
| 4,842,289 | 6/1989 | Samuels | 280/47.26 X |
| 4,953,879 | 9/1990 | Cain et al. | 280/47.19 |

Primary Examiner—Andres Kashnikow
Assistant Examiner—Brian L. Johnson
Attorney, Agent, or Firm—Poms, Smith, Lande & Rose

[57] ABSTRACT

An apparatus for transporting, storing and carrying a plurality of bowling balls, bowling accessories and equipment, includes a housing having vertically stacked interior compartments for storing bowling balls. Each compartment is adequate to house a single bowling ball. The housing is integrally molded with and rests on top of a base member having wheels. The base member includes a drawer compartment for storing bowling accessories and equipment. The base also includes a handle for lifting the entire apparatus. Each interior compartment is equipped with a pivotal front opening and closing bowling ball support. Each support includes a pair of molded orthogonal legs, with one constituting a cradle for holding a bowling ball in front of the housing when the support is tilted forward, and the second leg is provided with a central aperture for providing a stable position for a bowling ball to rest on within the housing, when the support is closed.

18 Claims, 3 Drawing Sheets

U.S. Patent  Dec. 24, 1991  Sheet 1 of 3  5,074,571
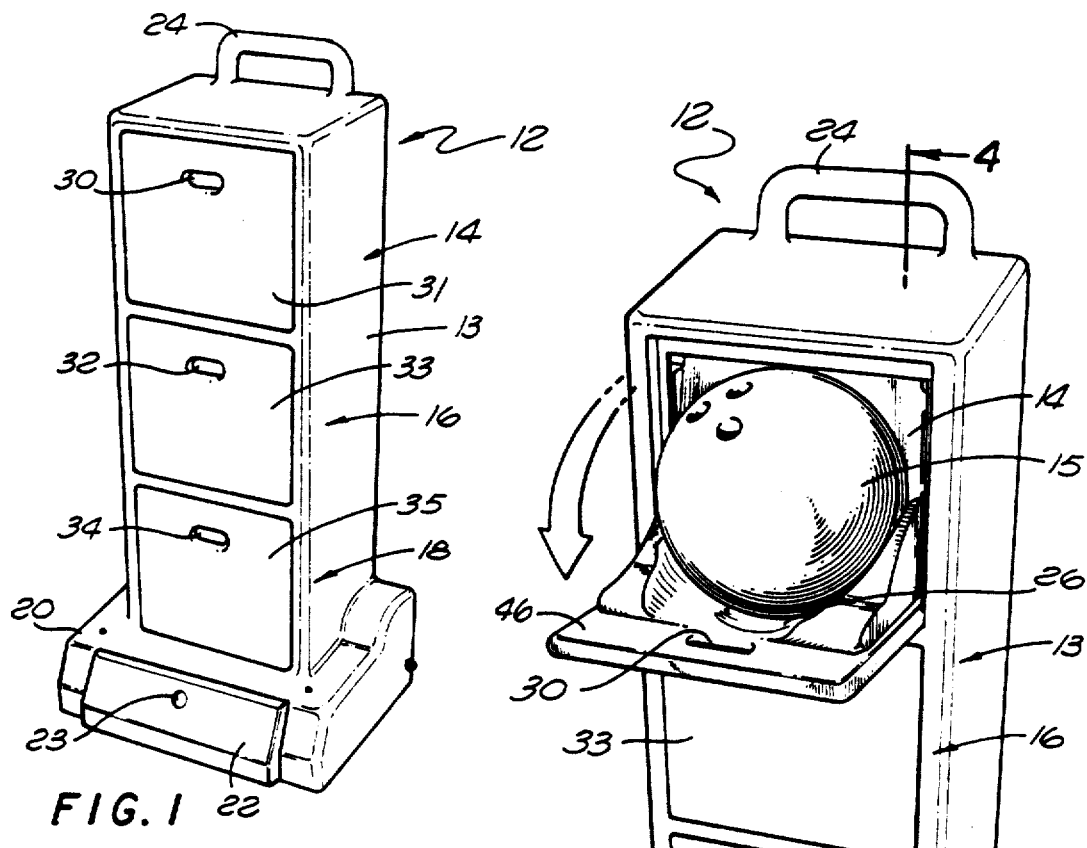
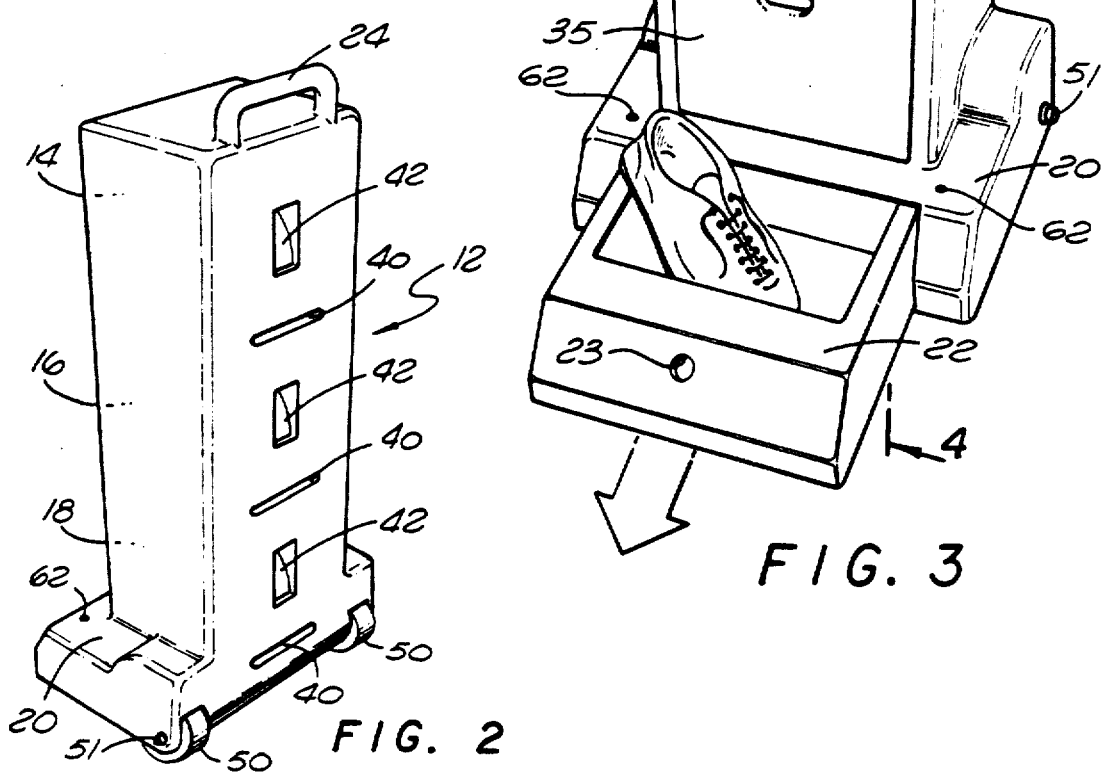

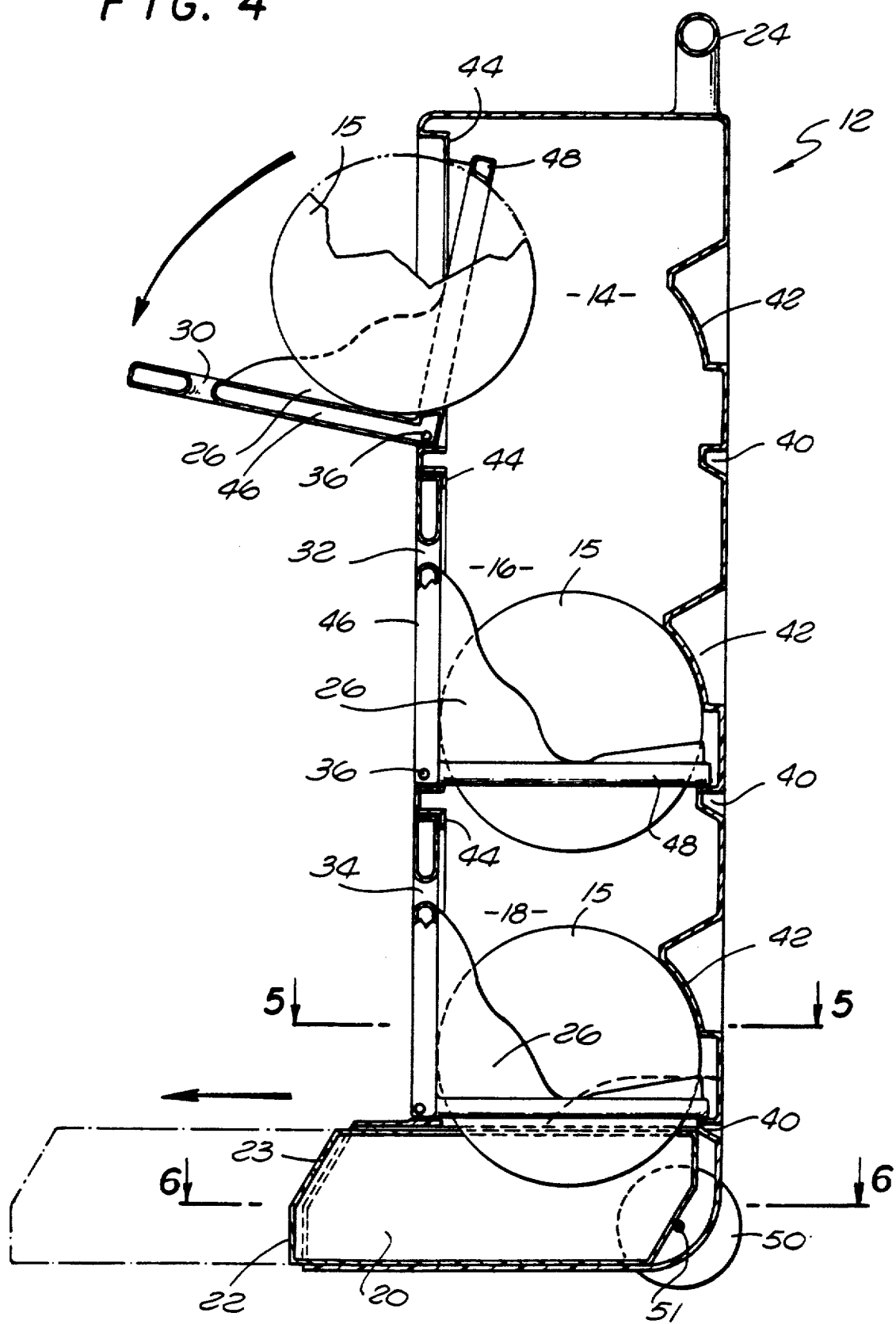

SPARE BOWLING BALL CARRIER

FIELD OF THE INVENTION

This invention relates to structures for storing and transporting heavy objects, and more particularly to an improved housing for holding and transporting bowling balls and bowling equipment and the like.

BACKGROUND OF THE INVENTION

Nowadays, bowling has gained rapid popularity both nationwide and worldwide. To date, there are approximately 140 million bowlers worldwide. In addition, bowling will be made a competitive event in the 1992 Olympic Games.

Along with the increased popularity of bowling came improvements. Bowling alley surfaces as well as bowling balls have undergone change and improvement. For example bowlers have traditionally used bowling balls with a hard rubber-coated surface. Many bowlers, however, have started bowling with balls covered with a urethane plastic material because many of the newer bowling lane surfaces are covered with a plastic material. These changes in both the bowling balls coverings and the alley surfaces have resulted in a game where the spin and curve of the bowling ball has increased, thus, causing the ball to hit the pins with greater force and a preferred angle.

The above-mentioned changes in the game of bowling have caused many bowlers to need and use more than one bowling ball in order to adapt to the different lane conditions. Some bowlers find it necessary to even use three or more bowling balls as a result of changing lane conditions.

A number of bowlers carry two or more bowling balls; one for attempting strikes and one for attempting spares. Bowlers may also use different bowling balls depending on if he or she desires two different grips.

It has often been a problem for bowlers who bowl with more than one bowling ball to carry and transport the balls to and from bowling alleys especially since each bowling ball weighs approximately sixteen pounds a piece. In addition, many bowlers who possess bowling accessories and equipment such as shoes, socks, towels, bowling gloves, powder and the like, also must carry these items to and from the alleys.

Traditionally, bowlers have used the standard soft flexible bag case with a pair of handles for storing their bowling ball and shoes. Alternatively, bowlers have also used a bowling case comprising a pair of hinged rigid or semi-rigid half shells having a latch to encase the bowling ball and securing the shells.

These bags and cases are sufficient to carry only one ball and a pair of shoes, which would usually get squashed inside the bag or case.

Other bowling ball carriers set forth in the prior art comprise wheeled carriers similar to certain golf carts.

Certain bowling ball carriers of this type have been set forth in U.S. Pat. Nos. 4,066,156, 4,166,530 and 4,220,343.

Even though some of the prior art devices have provided a means for carrying and housing more than one bowling ball along with a bowler's equipments no one device has provided a carrier where the bowler has easy access for retrieving and storing bowling balls, and/or a compartment for storing a bowler's equipment all integrally molded into one easy-to-use transportable unit.

For example, in U.S. Pat. No. 4,066,156 a bowler must open the lid to the top equipment storage compartment and pull a strap resting underneath each housed bowling ball, in order for the ball to roll forward onto its resting place, before gaining access to the ball. In U.S. Pat. Nos. 4,166,530 and 4,220,343 a bowler gains access to each bowling ball by rotating the cover of each storage case until the front surface is fully opened. The problem with this arrangement is that the balls remain inside their respective compartments. To gain access to his or her bowling balls, the bowler must insert his or her fingers inside the holes of the ball within the narrow confines of the housing in order to grab and remove the ball. It is well known that a bowler should never pick up a ball with his or her fingers, unless he or she is throwing the ball down the alley, because one may strain and damage his or her fingers. In addition, U.S. Pat. Nos. 4,166,530 and 4,220,343 show constructions involving a series of housings or compartments which may be stacked one on top of another instead of being integrally molded together to form a single assembly.

SUMMARY OF THE INVENTION

The bowling ball carrier of the present invention includes a housing constructed of a lightweight and durable material, such as plastic and the like. The housing is divided into a plurality of interior compartments, vertically or horizontally stacked adjacent one another. Each interior compartment is adapted for storing and holding an object such as a bowling ball. The stack of compartments, in turn, rests on a base unit having rollers, wheels or casters at one end and a downwardly facing handle at the opposite end. This handle is used to assist one in picking up the entire bowling bowl carrier. For greater convenience and superior structural integrity, the housing and its compartments and the base unit are integrally molded together to essentially form a single device.

Each compartment includes a pivotal front opening and closing door which is adopted for holding a bowling ball in such a way to allow easy access and hand gripping of the bowling ball. Each of the pivotal front opening and closing doors is substantially L-shaped and has a cradle for supporting and dispensing a bowling ball while opened, and a substantially circular aperture for engaging and supporting a bowling ball while closed. When the door is opened, the ball will swing forward out of the housing, so it is easily grasped. This L-shaped door may be pivotally mounted to the housing at the front thereof just below and inside of the door. This arrangement permits hand grasping of the bowling ball without requiring the bowler to improperly insert his fingers in the ball within the narrow confines of the housing and risk injury. Disposed within the base unit is a drawer compartment for storing shoes, bowling equipment or other similar articles; and this drawer is mounted at the base of the unit, extending forwardly, to give stability to the assembly when the balls are pivoted forward or "dispensed" and exert a forwardly directed force on the assembly.

The uppermost portion of the housing has a handle which is used when the entire assembly is being rolled from place to place. It is therefore an object of the present invention to provide an improved, durable, light weight, and transportable spare bowling ball storage assembly. It is another object of the present invention to provide transportable spare bowling ball carrier which is simple and inexpensive to manufacture.

In accordance with another feature of the invention, the housing may be provided with inward projections or detents which engage the housing walls and hold them in place which the L-shaped cradle or door is tilted to the closed position.

It is still yet another object of the present invention to provide a transportable spare bowling ball carrier having a pivotal ball support for allowing easy and unobstructed access for bowling balls to permit removal without requiring insertion of a user's fingers. It is still yet another object of the present invention to provide a transportable spare bowling ball carrier with a series of bowling ball storage compartments integral with its housing.

The foregoing and still other features and advantages of the present invention as well as a more complete understanding thereof will be made apparent from a study of the following detailed description of an illustrative embodiment of the invention in connection with the accompanying drawings.

BRIEF DESCRIPTION OF THE DRAWINGS

FIG. 1 is a perspective view of the front of a spare bowling ball carrier in accordance with the present invention;

FIG. 2 is a perspective view of the back of the spare bowling ball carrier;

FIG. 3 is a perspective view of the spare bowling ball carrier with one bowling ball compartment open, and a slide out equipment compartment or drawer in an open position;

FIG. 4 is a cross-sectional view of the bowling tall carrier as shown in FIG. 1 taken along line 4—4 of FIG. 3;

DESCRIPTION OF THE PREFERRED EMBODIMENT

Figure 5:
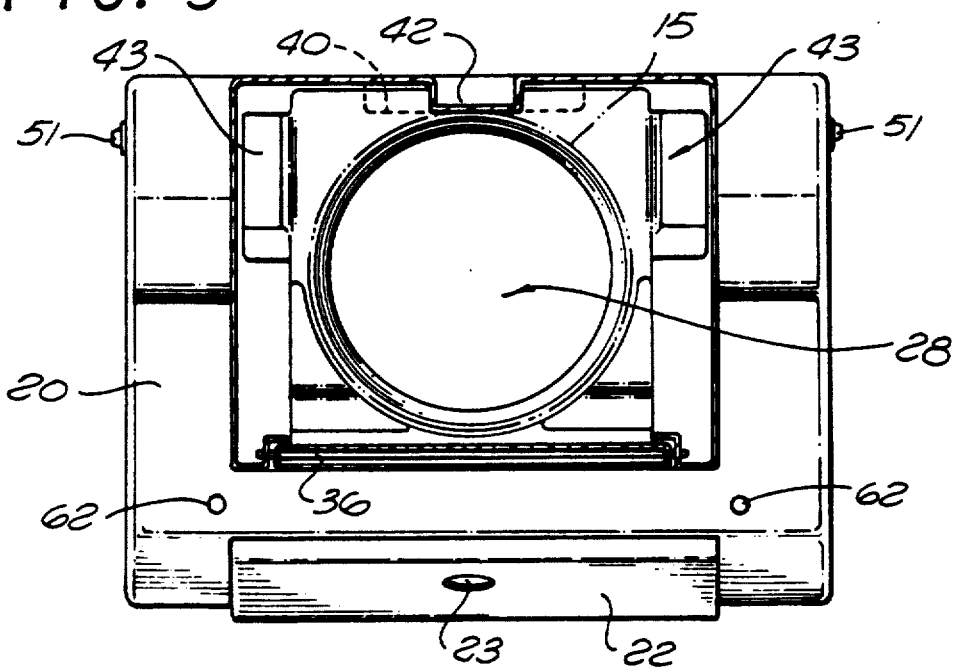
FIG. 5 is a cross-sectional view of the bowling ball carrier taken along line 5—5 of FIG. 4.

Referring more particularly to the drawings, an improved transportable spare bowling ball carrier embodying the present invention is illustrated generally by the reference number 12. The spare bowling ball carrier 12 is adapted for transporting as many three bowling balls along with shoes and other bowling equipment, although additional compartments could be added. FIG. 1 shows a front perspective view of the spare bowling ball carrier 12 which may be constructed from a rigid and durable lightweight-type material, for example, plastic or the like. The bowling ball carrier comprises a housing 13 which has 3 interior compartments or bowling ball receiving zones, 14, 16, 18 (as also shown in FIG. 4). These interior compartments 14, 16, 18 are integrally molded together and cooperate together to form a vertical stack. This stack is essentially rectangular in shape. Each compartment 14, 16, 18 is provided with a front opening and closing L-shaped door and bowling ball support means 31, 33, 35, respectively. Each support closure 31, 33, 35 is provided with a stop to which is integral with the housing and the interior compartments 14, 16, 18, respectively.

Figure 6:
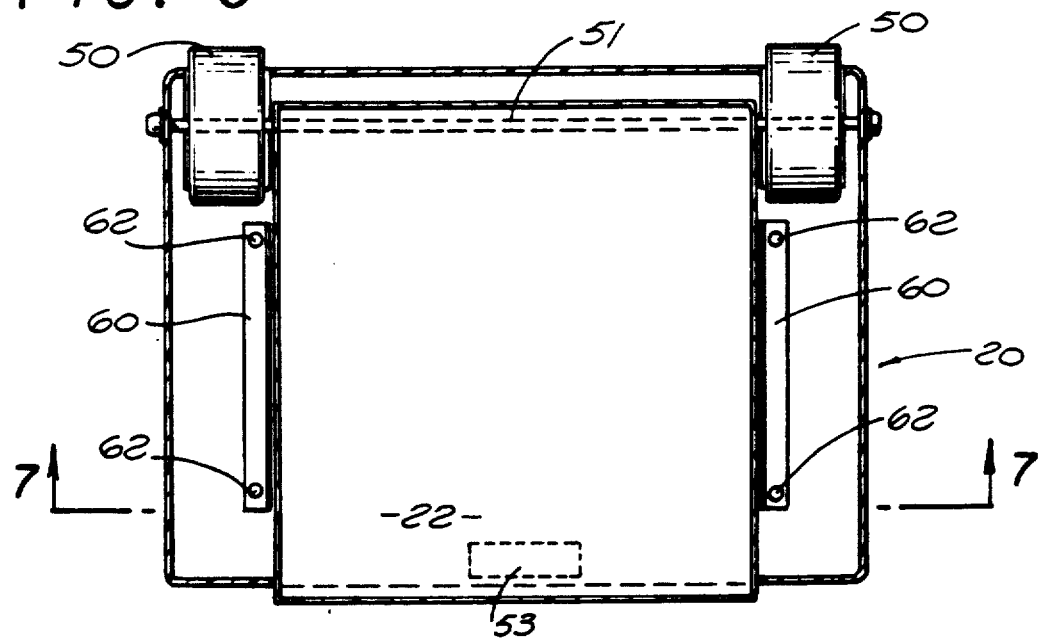
FIG. 6 is a cross-sectional view of the bowling ball carrier taken along line 6—6 of FIG. 4.

The spare bowling ball carrier 12 also includes a base member 20. The housing 13 is integrally molded with and rests on top of the base member 20. The base member 20 has a pair of rolling members 50 such as wheels as shown in FIG. 2, for assisting one to easily transport the carrier 12. The wheels 50 are mounted on a common axle 51, as shown in FIG. 6, which is secured and housed by the base member 20. The base member 20 also has a downward facing handle 53, as shown in FIG. 6, opposite to the wheels 50 for helping in picking up the entire bowling ball carrier 12 and placing it in, or removing it from, an automobile, for example.

The uppermost portion of the housing 13 has a handle 24 integrally molded to it, as shown in FIGS. 1–4, for rolling the carrier 12 from place to place.

As shown in FIGS. 1, 3 and 4 the base member 20 is provided with a slidable drawer compartment 22 for storing shoes and other bowling equipment, as illustrated in FIG. 3. The drawer compartment 22 includes a handle 23 for pulling open the compartment.

FIG. 3 best illustrates the carrier 12 supporting a bowling ball 15 with an uppermost front opening and closing support means 31 opened for gaining access to the bowling ball 15. Each front opening and closing support means 31, 33, 35 have a hand opening 30, 32, 34, respectively, to help open them. It is preferred that each hand opening 30, 32, 34 comprises an integrally molded aperture on the front of each support means 31, 33, 35. Alternatively, conventional U-shaped handles or knobs may be used to open or close the support means, instead of the hand openings 30, 32, 34.

As shown in FIGS. 3 and 4, each interior compartment 14, 16, 18 is adapted for housing a bowling ball 15. The slidable drawer 22, and the forwardly extending base 20 housing the drawer is useful for preventing the entire carrier 12 from overbalancing and tipping over when the bowling balls 15 are tilted forward in front of the base member 20.

Furthermore, each of the bowling ball support means 31, 33, 35 is comprised of a first leg 46 and a second leg 48 disposed at a substantial angle to one another. It is preferred that the first and second legs 46, 48, respectively, are disposed substantially perpendicular to one another. In addition, it is preferred that the legs 46, 48 be molded from the same piece of material, for example, plastic. As shown in FIGS. 4 and 5 each bowling ball support means 31, 33, 35 is connected to the front bottom of each interior compartment 14, 16, 18 by a pivot means consisting of a hinge member 36 for opening and closing each support means 31, 33, 35. Each hinge member 36 cooperates with each support means 31, 33, 35 at a point where both legs 46, 48 intersect.

An important aspect of the present invention is the manner in which one is able to either store or remove bowling balls 15. This permits a person to grasp the ball without inserting his fingers in the ball. A person utilizes the carrier 12 by grasping any of the hand openings 30, 32, 34 and pulling it towards him or her. The pivoted hinge member 36 of the bowling ball support means 31, 33, 35 makes it simple for the user to either open or close the device.

Once any of the support means 31, 33, 35 is fully open, a pair of stop means 43, which are integrally molded to the second leg 48 engage the sides of the opening for each interior compartment 14, 16, 18, thereby, enabling the first leg 46 to remain at a substantial angle to support a bowling ball 15 forwardly of the housing 13, without letting the bowling ball 15 fall off the support means 31, 33, 35.

Furthermore, each first leg 46 is provided with a cradle 26 which gives additional support for retaining the bowling ball 15 on the support means 31, 33, 35 when in an open position, as shown in FIGS. 3 and 4. It is preferred that the cradles 26 be integrally molded to the first leg 46 of the support means where the bowling ball 15 rests when the pivoting support means 31,33 or 35 is closed. Each second leg 48 is equipped with an aperture 28 for supporting the bowling ball 15 when each support means 31, 33, 35 is in a closed position. Each aperture 28 is substantially circular and has a diameter of approximately 7 and ¼ inches. The aperture 28 also additionally supports the bowling ball 15 when the bowling ball support means 31, 33, 35 are opened by allowing the ball 15 to rest against the second leg 48. To close any of the pivotal bowling ball support means 31, 33, 35 the user simply may push the first leg 46 upwardly towards the carrier 12. Each interior compartment 14, 16, 18 includes a second stop 40 for enabling the second leg 48 to rest in a substantially horizontal position while also supporting the bowling ball 15. A third stop 44, extending along the upper edge of each opening in the housing, engages the first leg 46 when any of the support means 31, 33, 35 are closed and provides an additional support supplementing the actions of the second stop 40.

While the bowling balls 15 are individually housed within each interior compartment 14, 16, 18, a detent 42 is present for substantially engaging the bowling balls 15, and preventing them from moving within the housing 13. Each detent 42 is integrally molded to the inside rear of the each interior compartment 14, 16, 18 as shown in FIG. 4. In addition, each opening and closing support means 31, 33, 35, as well as the bottom drawer compartment 22 may include a locking device to prevent anyone from opening up such compartments.

Figure 7:
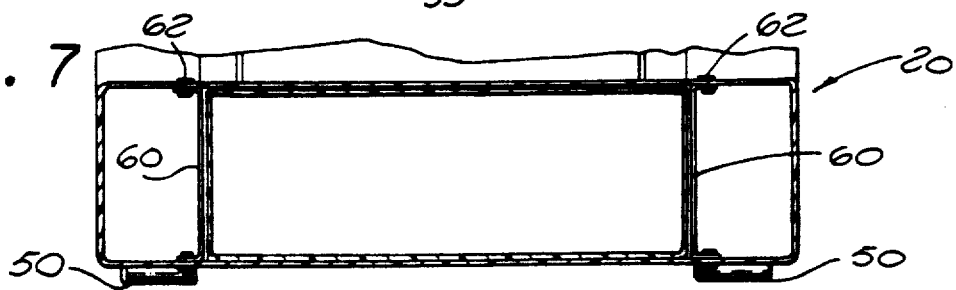
FIG. 7 is a partial cross-sectional view of the bowling ball carrier taken along line 7—7 of FIG. 6.

FIG. 5 provides a cross sectional view of the carrier 12 taken directly from above the carrier 12. The base 20 of the carrier 12 is approximately 15 inches by 18 inches by 5 inches high. The size of such a base unit 20 is sufficient to house a drawer compartment 22 for holding an individual's bowling gear. Furthermore, the total height of the carrier of a present invention is approximately 40", excluding the height of the handle 24. As shown in FIGS. 6 and 7, the carrier 12 includes a pair of support brackets 60 which are firmly secured to the inside of the base member 20 by rivets 62. The support brackets 60, which are preferably constructed from a strong, yet lightweight metal, provides reinforcing to the base 20, especially when the compartments 14, 16, 18 contain the heavy bowling balls 15. The design of the support bracket 60 also provides a track for the slidable drawer compartment 22.

Accordingly, although the invention has been described and illustrated with respect to the preferred embodiment thereof, it is to be understood that it is not so limited, since changes and modifications may be made therein which are within the full intended scope of the present invention.

It is obvious that minor changes and modifications may be made in the form of the construction of the invention without departing from the material spirit thereof. Thus, by way of example and not of limitation, the carrier could be made to accommodate two rather than three bowling balls, and would thus be somewhat shorter but otherwise substantially the same as the illustrated three ball embodiment. It is not, thereof, desired to confine or limit the invention to the exact form herein described, but is desired to include all such as properly coming within the scope claimed.

What is claimed is:

1. A transportable spare bowling ball carrier comprising:

a base member;

said base member having rolling member operatively attached thereto;

a housing having a plurality of interior compartments cooperating together, forming a vertical stack, and each compartment being adapted for housing a bowling ball;

said vertical stack forming an integral unit with said base member;

said compartments each having a front opening and closing generally L-shaped support means holding said bowling ball and means secured to said support means for dispensing said bowling ball;

means for pivotally mounting said support means to said housing;

said base member having a compartment therein for containing articles; and a handle secured to said housing for rolling said carrier from place to place.

2. The bowling ball carrier as defined in claim 1 wherein said base member has a downward facing handle opposite to said rolling members for use in picking up the bowling ball carrier.

3. The bowling ball carrier as defined in claim 1 wherein said compartment for holding and storing articles further comprises a front opening and slidable drawer.

4. The bowling ball carrier as defined in claim 2 wherein said base member is provided with support members secured to said base for reinforcing said base, said support members further including a portion providing a track for a slidable closure.

5. The bowling ball carrier as defined in claim 1 wherein said support means for holding said bowling ball has a first leg and a second leg interconnected and disposed at a substantial angle to one another.

6. The bowling ball carrier as defined in claim 1 further comprising means for preventing said carrier from tipping over when said bowling ball support means are open, said preventing means constituting a forwardly extending portion of said base.

7. The bowling ball carrier as defined in claim 5 wherein said first leg has a cradle for supporting and retaining said bowling ball outwardly from said housing, when said support means is open.

8. The bowling ball carrier as defined in claim 5 wherein said second leg has an aperture for engaging and supporting said bowling bowl when said support means is in a closed configuration.

9. The bowling ball carrier as defined in claim 1 wherein said interior compartments having a detent means for engaging said bowling balls and preventing said bowling balls from moving within said interior compartments when said support mean are closed.

10. A transportable spare bowling ball carrier comprising:

a base member;

said base member having rolling members operatively attached thereto;

a housing having three interior compartments cooperating together, forming a vertical rectangular stack forming an integral unit with said base member;

said interior compartments each having a front opening and closing generally L-shaped support means for holding said bowling ball and means secured to said support means for dispensing said bowling ball;

said base member having a compartment therein for containing articles;

said compartment for containing articles having a front opening and slidable drawer;

said base member having downwardly facing handle opposite to said rolling members for use in picking up the bowling ball carrier;

a hand opening formed in said support means for opening and closing said support means;

said opening and closing support means having a first leg and a second leg interconnected and disposed at a substantial angle to one another;

means for pivotally mounting said support means to said housing;

said first leg having a cradle for supporting and retaining said bowling ball when said support means is open;

said second leg having an aperture for engaging and supporting said bowling ball when said support means is closed;

said interior compartments having a detent for substantially engaging said bowling balls and preventing said bowling balls from substantially moving within said interior compartments; and a handle secured to said housing for rolling said carrier from place to place.

11. The bowling ball carrier as defined in claim 10 wherein said vertical stack of interior compartments is integrally molded with said base member.

12. The bowling ball carrier as defined in claim 12 wherein said carrier is approximately 40 inches high by 18 inches wide and is constructed essentially from a lightweight and durable plastic material.

13. The bowling ball carrier as defined in claim 12 wherein said second legs each having a first stop enabling said first leg to remain at a substantial angle to support a bowling ball while said support means is in an open position, said interior compartments each having a second stop for enabling said second leg to rest in a substantially horizontal position while said support means is in a closed position.

14. A transportable spare bowling ball carrier comprising:
a base member;
said base member having rolling members operatively attached thereto;
a housing having a plurality of interior compartments cooperating together, forming a vertical stack and being adapted for housing at least one bowling ball;
said vertical stack being integrally molded with said base member;
said interior compartments each having a front opening and closing generally L-shaped support means for holding said bowling ball and means secured to said support means for dispensing said bowling ball;
said base member having a slidable drawer compartment for confining articles therein;
means for preventing said carrier from tipping over when said bowling ball support means are open, said means constituting a forwardly extending portion of said base;
means for pivotally mounting said support means to said housing;
said support means having a first leg and a second leg interconnected and disposed in an opposing relationship at a substantial angle to one another;
means for opening and closing said support means;
means for opening and closing said compartment for confining articles;
said interior compartments having a detent for substantially engaging said bowling balls and preventing said bowling balls from substantially moving within said housing; and
a handle member secured to said housing for rolling said carrier from place to place.

15.. The bowling ball carrier as defined in claim 14 wherein said base member has support members attached thereto for supporting said vertical stack of compartments on top of said base, said support members further including a portion providing a track for said drawer compartment.

16. The bowling ball carrier as defined in claim 14 wherein said first leg has an integrally formed cradle for retaining said bowling ball.

17. The bowling ball. carrier as defined in claim 14 wherein said second leg has an aperture for engaging and supporting said bowling tall.

18. The bowling carrier as defined in claim 14 wherein each second leg has a first stop means enabling said first leg to remain at a substantial angle to support said bowling ball in front of said housing while said support is in an open position, each said interior compartment has a second stop means for enabling said second leg to rest in a substantially horizontal position while said support means is in a closed position.

* * * * *